United States Patent [19]
Couture

[11] 4,320,559
[45] Mar. 23, 1982

[54] ANIMAL HIDE CONVEYING METHOD AND APPARATUS

[75] Inventor: William F. Couture, Amarillo, Tex.

[73] Assignee: Iowa Beef Processors, Inc., Dakota City, Nebr.

[21] Appl. No.: 102,005

[22] Filed: Dec. 7, 1979

[51] Int. Cl.$^3$ .......................... A22B 5/00; A22B 5/16
[52] U.S. Cl. ........................................... 17/50; 17/21; 17/51; 17/24; 406/21; 406/33; 406/79
[58] Field of Search ..................... 17/50, 24, 21, 51; 406/19, 21, 28, 31, 33, 79

[56] References Cited

U.S. PATENT DOCUMENTS 2,576,543  11/1951  Smith .............................. 406/28 X
3,541,637  11/1970  Robison et al. ..................... 17/21 X

FOREIGN PATENT DOCUMENTS 1430439  3/1976  United Kingdom ................. 406/21

Primary Examiner—Willie G. Abercrombie
Attorney, Agent, or Firm—Beveridge, DeGrandi & Kline

[57] ABSTRACT

Hides are pulled from animal carcasses in a slaughterhouse, and conveyed upwardly through a pneumatic conveyor conduit for further handling. The conduit tangentially enters a vacuum chamber which is connected to a vacuum source. The chamber has a lower discharge opening which is normally closed by a gate; however, when a hide arrives in the chamber from the conduit, the vacuum is reduced to enable the gate to open and release the hide through the discharge opening.

30 Claims, 1 Drawing Figure

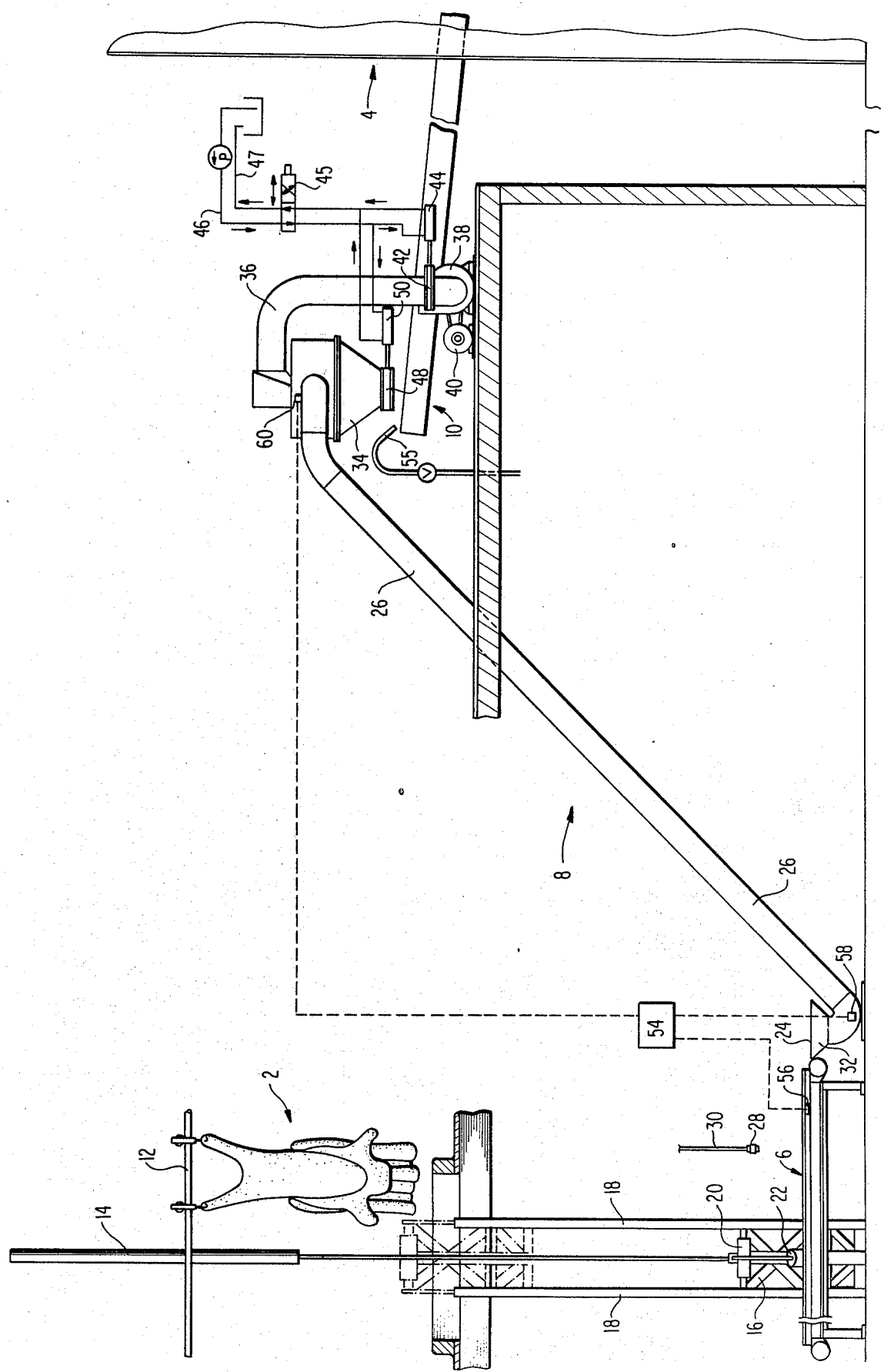

ANIMAL HIDE CONVEYING METHOD AND APPARATUS

BACKGROUND OF THE INVENTION

This invention relates to a method and apparatus for handling hides which have been removed from animals slaughtered in a slaughterhouse, and particularly to the structure and use of a pneumatic conveyor for handling of such hides.

In normal slaughterhouse operations, there is a station or a series of stations where hides are removed from the animals. The task of handling the removed hides has necessitated substantial manpower and/or conveyor systems. In some facilities, hides are stacked on pallets which are handled conventionally to transport the hides to a hide processing facility either adjacent to the slaughterhouse or at a remote location. In the facility where the present system is installed, hides were engaged on hooks on an endless cable conveyor which carried the hides to the roof of the building where they were fed into a flume for further transportation to a nearby hide processing building.

The present invention presents a new and substantial improvement to such hide conveying systems which reduces substantially the manpower requirements for hide handling and is uncomplicated, effective, fast, efficient and relatively inexpensive.

SUMMARY OF THE INVENTION

According to the invention, hides are handled in an apparatus and by a method which involves pulling the hide from a slaughtered animal at a hide pulling station, conveying the hide from the hide pulling station in a system which includes a conduit provided with a lower inlet end and an upper outlet end. Air is flowed through the conduit to carry the hides from the inlet end to the outlet end.

In a more general sense, the invention also involves a pneumatic conveyor system which includes a conduit with a lower inlet end and an upper outlet end, a vacuum chamber connected both to the outlet end and to a vacuum source to produce a flow of air through the conduit to carry objects through the conduit. A discharge opening is provided in the lower end of the vacuum chamber to release the conveyed articles.

Further, the invention involves a pneumatic conveyor system with a conduit, a vacuum chamber connected to the upper outlet end of the conduit and a vacuum source connected to the chamber, such apparatus including means for reducing the vacuum in the chamber when a conveyed article is in the chamber.

Preferably, the invention also involves a tangential connection between the upper end of the conveyor conduit and the vacuum chamber. The chamber has a hide discharge opening normally closed by a gate which is opened to enable hides to fall by gravity from the chamber. The vacuum is reduced when a hide is in the vacuum chamber; and, the gate is closed and the vacuum is restored after a hide has been discharged.

Although the invention may take many forms, a preferred embodiment thereof is disclosed herein for illustrative purposes.

BRIEF DESCRIPTION OF THE DRAWINGS

The drawing illustrates in schematic form an installation constructed according to the invention, the hide pulling apparatus being enlarged substantially for illustrative purposes only.

BRIEF DESCRIPTION OF A PREFERRED EMBODIMENT

The drawing shows a hide pulling station 2 in a slaughterhouse, a hide processing building 4 where hides are treated, and a conveyor system for transporting the hides from the hide pulling station to the hide processing building 4. This conveyor system includes a belt conveyor 6, a pneumatic conveyor 8 and a flume 10.

The hide pulling station 2 is preferably constructed according to the disclosure of U.S. Pat. No. 3,810,277 which is incorporated herein by reference. Such a system includes a rail 12 which provides a track for the carcass-supporting trollies conventionally used in such installations. At the hide pulling station, the rail passes a vertical hydraulic cylinder 14 which has its rod connected to a carriage 16. The carriage 16 is guided for vertical movement by tracks 18. Two jaws on the carriage, one of which is shown at 20, are relatively movable from an open position to a closed hide-gripping position by an hydraulic cylinder 22. As more fully described in the previously-mentioned U.S. Pat. No. 3,810,277, the hide pulling apparatus commences its cycle when the carriage 16 is at its uppermost position and the hide gripping jaws 20 are open. The cylinder 22 is actuated to close the jaws 20 and grip the hide, the cylinder 14 then being actuated to forcibly move the carriage 16 downwardly to pull the hide from the carcass. At the lower end of the carriage travel, the cylinder 22 is operated to open the jaws, releasing the hide from the carriage 16 at the lower level or basement of the hide pulling station 2.

The present invention involves the transporting of hides from the hide-pulling station to the hide processing facility by means of a pneumatic system 8, preferably operated in conjunction with the belt conveyor 6 which carries hides to the pneumatic conveyor, and the flume 10 which carries hides from the pneumatic conveyor to the hide processing facility.

The belt conveyor 6 is located at the lower hide-discharging portion of the hide pulling station, directly beneath the lower position of the jaws 20 on the carriage 16. After the hide-gripping jaws 20 are opened, the hide moves on this motor-driven belt 6 to the lower inlet end 24 of the pneumatic conveyor conduit 26. A spray head 28 on pipe 30 sprays water on the hides as they move on the belt toward the pneumatic conveyor. This water to some extent serves as a sealant and lubricant which facilitates and promotes movement of the hides during their subsequent travel through the conduit of the pneumatic conveyor system.

A hide discharged from the end of belt conveyor 6 falls into a hopper 32 at the lower inlet end of the pneumatic conveyor conduit 26. The upper end of the conduit 26 is connected to a vacuum chamber 34 which, in turn, is connected by a suction pipe 36 to a vacuum pump 38 driven by an electric motor 40. A perforated screen is located in the suction pipe 36 near the vacuum chamber to prevent small pieces of any transported material from entering the pump 38. A vacuum cutoff gate 42, located in the suction pipe 36, is moved between open and closed positions by a double acting hydraulic cylinder 44 connected by a valve 45 to a pressurized hydraulic fluid supply line 46 and an hydraulic return line 47. Preferably, the vacuum chamber 34, vacuum pump 38 and their adjunct components are located on the roof of the slaughterhouse building.

The vacuum chamber 34 is essentially a closed chamber formed of an upper cylindrical section and a lower truncated conical section which has a hide discharge opening at its lower end. The conduit 26 tangentially enters the cylindrical section of the vacuum chamber 34 so that the velocity of hides entering the vacuum chamber will be dissipated by frictional movement around the interior wall of the chamber 34.

The hide discharge opening at the bottom of the chamber 34 is closed by a slide gate 48 which is connected to and operated by a two-way hydraulically operated cylinder 50. The cylinder 50 is connected by hydraulic lines to the valve 45 which, in turn, is connected to the hydraulic supply line 46 and return line 47. When closed, the gate 48 seals the vacuum chamber 34 to provide optimum vacuum and ample hide-transporting air flow in the conduit 26.

When a hide enters the vacuum chamber 34, a control circuit 54 actuates the hydraulic solenoid valve 45. This simultaneously opens slide gate 48 and closes slide gate 42, allowing the hide to fall through the gate 48 into the flume 10.

Two seconds after the discharge gate 48 is opened, the hide has fallen from the vacuum chamber 34, and the system automatically reverts back to a ready position. A two second time delay circuit closes the gate 48 and opens the vacuum cutoff gate 42 to provide full vacuum to the pneumatic conveyor system.

A hide falling from the discharge gate 48 falls into the flume 10 located immediately therebelow. This flume 10 contains a sufficient quantity of longitudinally moving liquid to carry the hides into the hide processing building 4. Longitudinal liquid flow in the flume is produced by introducing liquid from conduit 55 into the upstream end of the flume. In the hide processing facility 4, the hides are washed to remove blood and dirt, and then passed through a fleshing machine which removes manure and caked dirt from the hair side of the hide and removes flesh particles from the flesh side. The hides are soaked in brine to kill bacteria, and they may also be subjected to conventional tanning processes to produce leather.

To monitor the movement of hides through the apparatus and to control certain functions of the system, the control circuit 54 is connected to hide sensing photoelectric sensors 56 and 58 and a microswitch sensor 60. Output signals from the circuit 54 are transmitted by conductors to the drive motor of the belt conveyor 6 and to the solenoid coil which actuates the valve 45.

As will be evident from the location of the hide sensors 56, 58 and 60, the sensor 56 sends a signal to the circuit 54 when a hide on belt conveyor 6 is approaching the point where it will discharge into the inlet end of the conduit 26. The sensor 58 sends a signal to circuit 54 when a hide is in the lower inlet end of the pneumatic conveyor 26; and, the sensor 60 sends a signal to the circuit 54 when a hide passes from the upper end of the conduit 26 into the vacuum chamber 34.

For energy conservation, the vacuum pump 38 has a capacity capable of transporting only one average size hide up through the conduit 26 at any time, preferably in about six to ten seconds depending on the hide weight. To prevent the system from becoming incapacitated by the presence of more than one hide, the circuit 54 is constructed and operated to ensure that only one hide will be present in the conduit 26 at any time. In this connection, the circuit includes a latching relay which is actuated by the inlet sensor device 58 and is unlatched by the outlet sensor device 60. The contacts of the latching relay and the sensor 56 on belt conveyor 6 are interconnected so that the belt-driving motor for the conveyor 6 will be deactivated when the latching relay is latched and the sensor 56 detects that a hide is approaching the inlet end of the conduit 26. Accordingly, when an earlier hide is located in the conduit 26 between sensors 58 and 60, and a subsequent hide interrupts the light beam of sensor 56, the belt 6 will be stopped so the subsequent hide will not enter the conduit 26 to overload the system. When the hide in conduit 26 actuates sensor 60, the relay is unlatched, thereby activating the conveyor 6 to move the subsequent hide to the inlet end of the conduit 26.

Another function of the sensor 60 is to place the vacuum chamber 34 in a hide-discharging condition, opening the hide discharge gate 48 and reducing the vacuum. When a hide actuates the arm of the microswitch sensor 60, the switch sends a signal to the circuit 54, indicating that a hide is entering the chamber 34. In response to this signal, the circuit 54 actuates the coil of solenoid valve 45, simultaneously opening the hide discharge gate 48 and closing the vacuum cutoff gate 42. The closing of gate 42 reduces the vacuum in chamber 34 so that air will not be drawn into chamber 34 to impede or prevent the gravitational release of the hide through open gate 48 into the flume 10.

When the system is operating properly, no more than one hide will be in the vacuum chamber 34 at any time, each hide being released rather promptly through the discharge gate 48. To prevent hides from accumulating in the vacuum chamber 34 when the discharge gate fails to operate, there is an automatic shutdown system which includes a limit switch located at the rear of discharge gate 48. The automatic shutdown system includes a time delay, reset at zero each time the limit switch is actuated, and operable to shut down the vacuum system automatically thirty seconds after the limit switch is reset. Accordingly, the vacuum system will shut down when more than thirty seconds elapse between successive operations of the gate 48, indicating that the system is malfunctioning and that hides may be accumulating in the vacuum chamber 34.

Although the configuration and details of the invention may vary widely, it is preferred to have two similar hide pulling stations associated with each belt conveyor. The conduit 26 may be polyvinyl chloride pipe having a 14 inch outside diameter. A suitable vacuum pump 38 is a fan operated at 3600 revolutions per minute by a 125 horsepower motor 40.

Persons familiar with the field of the invention will recognize that it may take many forms other than the preferred disclosed embodiment. Accordingly, it is emphasized that the invention is not limited only to this embodiment but is embracing of modifications thereto and variations thereof which fall within the spirit of the following claims.

I claim:

1. Hide pulling and handling apparatus for a packinghouse, comprising
    a hide pulling station provided with means for pulling the hide from a slaughtered animal,
    conveyor means for moving hides from the hide pulling station,
    said conveyor means including a conduit with an inlet end and an outlet end which is elevated with respect to the inlet end, means for producing a flow of air through the conduit to carry hides from the inlet end to the outlet end, a vacuum chamber connected to the outlet end of said conduit, said means for producing a flow of air through said conduit including a vacuum source connected to said chamber, said vacuum source being displaced from the outlet end so as not to obstruct the movement of hides from the outlet end into the vacuum chamber.

2. The apparatus of claim 1 including a flume for receiving hides from said chamber, means for circulating a body of liquid longitudinally through said flume to convey hides along said flume.

3. The apparatus of claim 1 including a hide discharge opening in the lower end of the chamber for releasing hides from the chamber.

4. The apparatus of claim 3 wherein the chamber has a circular horizontal cross section, said conduit being connected tangentially to said chamber.

5. The apparatus of claim 3 having a gate at the hide discharge opening, said gate being movable from a closed position to an open position to permit hides to fall from said chamber.

6. The apparatus of claim 1 having means for reducing the vacuum in the chamber when a hide is in the chamber.

7. The apparatus of claim 6 having means for restoring the vacuum in the chamber after a hide leaves said chamber.

8. The apparatus of claim 7 including a hide discharge opening in the lower end of the chamber for releasing hides from the chamber, a gate positioned in the hide discharge opening and being movable from a closed position obstructing the hide discharge opening to an open position for releasing hides from said chamber.

9. The apparatus of claim 6 wherein the means for reducing the vacuum is a gate between the vacuum source and the chamber.

10. The apparatus of claim 9 having means for restoring the vacuum in the chamber after a hide leaves said chamber.

11. The apparatus of claim 9 including a hide discharge opening in the lower end of the chamber for releasing hides from the chamber, a gate positioned in the hide discharge opening and being movable from a closed position obstructing the hide discharge opening to an open position for releasing hides from said chamber.

12. The apparatus of claim 1 wherein said conveyor means includes a first conveyor for receiving and supporting hides dropped thereon at the hide pulling station and for carrying said hides to the inlet end of the conduit.

13. The apparatus of claim 12 wherein the inlet end of the conduit faces upwardly and is located in the path of hides released from the first conveyor.

14. A pneumatic conveyor system, comprising a conduit with an inlet end and an outlet end which is elevated with respect to the inlet end, means for producing a flow of air through the conduit to carry articles from the inlet end to the outlet end, a vacuum chamber which has a circular horizontal cross section and is connected to the outlet end of said conduit, said conduit being tangentially connected to said chamber, said means for producing a flow of air through said conduit including a vacuum source connected to said chamber, and a discharge opening in the lower end of the chamber for releasing articles from the chamber, said vacuum source being displaced from the outlet end of the conduit so as not to obstruct the movement of articles from the outlet end into the vacuum chamber, a gate at the discharge opening, said gate being movable from a closed position to an open position at which articles fall by gravity from said chamber.

15. A pneumatic conveyor system, comprising, a conduit with an inlet end and an outlet end which is elevated with respect to the inlet end, means for producing a flow of air through the conduit to carry articles from the inlet end to the outlet end, a vacuum chamber connected to the outlet end of said conduit, said means for producing a flow of air through said conduit including a vacuum source connected to said chamber, said vacuum source being displaced from the outlet end of the conduit so as not to obstruct the movement of articles from the outlet end into the vacuum chamber, and means for reducing the vacuum in the chamber in response to the arrival of a conveyed article into the chamber, a discharge opening in the lower end of the chamber for releasing conveyed articles from the chamber, a gate positioned in the discharge opening and being movable from a closed position obstructing the discharge opening to an open position for releasing conveyed articles from said chamber.

16. The apparatus of claim 15 having means for restoring the vacuum in the chamber after a conveyed article leaves said chamber.

17. The apparatus of claim 15 including a discharge opening in the lower end of the chamber for releasing conveyed articles from the chamber, a gate positioned in the discharge opening and being movable from a closed position obstructing the discharge opening to an open position for releasing conveyed articles from said chamber.

18. The apparatus of claim 15 wherein the means for reducing the vacuum is a gate between the vacuum source and the chamber.

19. The apparatus of claim 18 having means for restoring the vacuum in the chamber after a conveyed article leaves said chamber.

20. A method of handling hides in a packinghouse, comprising the steps of:
pulling the hide from a slaughtered animal at a hide pulling station,
conveying the hide from the hide pulling station on a conveyor system,
said conveying including the step of placing the hide in a conduit which has an inlet end and an outlet end which is elevated with respect to the inlet end, and producing a flow of air through the conduit to carry the hide from the inlet end to the outlet end,
receiving the hide in a vacuum chamber connected to the outlet end of said conduit, said flow of air through said conduit being produced by establishing communication between said chamber and a vacuum source which is displaced from the outlet end so as not to obstruct the movement of hides from the outlet end into the vacuum chamber.

21. The method of claim 20 including the step of moving hides from said chamber into a flume, and circulating a body of liquid longitudinally through said flume to convey hides along said flume.

22. The method of claim 20 including the step of releasing hides from the chamber through a hide discharge opening in the lower end of the chamber.

23. The method of claim 22 wherein the chamber has a circular horizontal cross section, and the hides are introduced from the conduit tangentially into said chamber.

24. The method of claim 22 having a gate at the hide discharge opening, and moving said gate from a closed position to an open position to permit hides to fall from said chamber.

25. The method of claim 20 including the step of reducing the vacuum in the chamber when a hide is in the chamber.

26. The method of claim 25 including the step of restoring the vacuum in the chamber after a hide leaves said chamber.

27. The method of claim 26 including the step of releasing hides from the chamber through a hide discharge opening in the lower end of the chamber, and moving a gate positioned in the hide discharge opening from a closed position obstructing the hide discharge opening to an open position to release hides from said chamber.

28. The method of claim 25 wherein the vacuum is reduced by closing a gate between the vacuum source and the chamber.

29. The method of claim 28 including the step of restoring the vacuum in the chamber after a hide leaves said chamber.

30. The method of claim 28 including the step of releasing hides from the chamber through a hide discharge opening in the lower end of the chamber, and moving a gate positioned in the hide discharge opening from a closed position obstructing the hide discharge opening to an open position to release hides from said chamber.

* * * * *